US005628342A

United States Patent [19]

McNealy et al.

[11] Patent Number: 5,628,342

[45] Date of Patent: May 13, 1997

[54] PROPELLANT TRANSPORTING DEVICE

[75] Inventors: Richard C. McNealy, McKinney, Tex.; Stuart R. Grossberg; Ralph Minore, both of Guilford, Conn.

[73] Assignees: Olin Corporation, Cheshire; Profile Machine Products, Madison, both of Conn.; Anderson Columbiana Trading, McKinney, Tex.

[21] Appl. No.: 373,728

[22] Filed: Jan. 17, 1995

[51] Int. Cl.$^{6}$ .............................. F16K 24/00; B65D 6/28

[52] U.S. Cl. .......................... 137/587; 137/590; 220/612; 220/633; 220/649

[58] Field of Search ............................ 251/111; 137/590, 137/587, 316; 220/612, 633, 649; 206/386

[56] References Cited

U.S. PATENT DOCUMENTS

| | | | |
|---|---|---|---|
| 145,139 | 4/1873 | Wiesebrock | 220/633 X |
| 1,584,641 | 5/1926 | Paige | 220/633 X |
| 2,071,679 | 2/1937 | Bretschger | 220/649 X |
| 3,475,005 | 10/1969 | Semon | 251/111 |
| 3,952,904 | 4/1976 | Verlinden | 220/612 X |
| 4,655,359 | 4/1987 | Fairgrieve | 220/612 |
| 4,962,863 | 10/1990 | Wendling et al. | 220/649 |
| 5,199,570 | 4/1993 | McKenzie | 220/649 X |
| 5,226,558 | 7/1993 | Whitney et al. | 206/386 X |
| 5,365,980 | 11/1994 | deBerardinis | 137/587 X |

*Primary Examiner*—Hoang Nguyen
*Attorney, Agent, or Firm*—Dale L. Carlson

[57] ABSTRACT

A cylinder for transporting hazardous material such as hypergole material which is fabricated from stainless steel and includes a containment system for containing any spillage in the event of malfunction during loading and unloading. The cylinder also includes a bottom skirt, attached to the lower head of the pressure vessel, and which contains a pocket assembly for the reception of fork lift and pallet lift equipment. A locking system is provided for the valves which will prevent accidental opening or closing of the valve.

3 Claims, 3 Drawing Sheets

PROPELLANT TRANSPORTING DEVICE

BACKGROUND OF THE INVENTION

1. Field of the Invention

This invention relates generally to a device for transporting hazardous materials, and more particularly, to a cylinder which may be used for the transporting of hypergole materials.

2. Background

Hypergole materials such as hydrazine and dinitrogen tetroxide are commonly used in propellant applications and also in other applications such as pharmaceutical. These materials are poisonous and considered hazardous. Also, they quite commonly need to be stored and utilized under pressure. According, their transportation presents many problems.

One common use for such materials is as spacecraft fuel. Spacecraft fuel tanks for storable propellants are pressure vessels into which the fuels are loaded under pressure and are further charged with pressure to provide the driving force for the fuel to the rocket motor. The fuel tanks are normally mounted on the spacecraft and the fuel must be charged into the tanks from the delivery container while the space craft is on the launch pad or in a vehicle assembly building.

One method of shipping such hypergole materials has been by large tank trucks or railway cars. However, the delivery of the materials in such bulk quantities requires that provision be made for storage of a large quantity of the material which will not immediately be used. It is thus desirable that the material be shipped in smaller quantities.

Smaller shipments of the material have been made in 55 gallon steel drums for the eventual transfer to pressure tanks for loading into space vehicle fuel tanks and process vessels. Recognizing the hazards of the chemicals, regulatory authorities issued rule makings requiring the use of secondary containment. However, in the event of leakage or spillage, the overpack may become contaminated presenting a disposal problem. It was also discovered that these drums may have excess pressure exerted on them during transfer operations which could result premature failure.

Additionally, both the drum and tank car methods are open systems in that the container must be opened to the atmosphere for unloading. This permits potentially hazardous fumes to escape to the atmosphere and also increases the chances for spillage. As a result, when handling such "open systems" operators were required to wear protective clothing and take special precautions. As a result of the special requirements to handle the unloading of the hypergole material from these types of containers, the cost involved with the delivery and loading of the material into the space vehicle fuel tank is relatively high.

Prior art pressure tanks do not provide for features which allow them to be transported under appropriate regulations and allow the same tank to be used as part of an integrated hypergole loading and conditioning system. The prior art tanks do not have the desired light weight for ease of use nor do such tanks provide for the necessary safety when used without secondary containments.

SUMMARY OF THE INVENTION

In view of the above, it is an object of the present invention to provide an improved transporting device for hazardous materials.

More specifically, it is an object of the present invention to provide an improved transporting device for hypergole materials which is capable of being handled by conventional equipment.

Yet another object of the present invention is to provide an improved transporting device for hypergole materials which minimizes spillage.

A still further object of the present invention is the provision of an improved transporting device which is a safe and efficient package for the transportation of hypergole materials.

Yet still another object of the present invention is the provision of an improved transporting device which permits hypergole material to be transported under pressure.

These and other object of the present invention may be accomplished through the provision of a cylinder for transporting a hazardous liquid under pressure which comprises a cylindrical shell having upper and lower ends, an upper head attached to the upper end of the shell, and a lower head attached to the lower end of the shell, said shell and upper and lower heads defining a pressure vessel. A valve system is provided on the upper head for loading and unloading the pressure vessel and an upper cylindrical skirt is attached to said upper head and surrounds said valve system. A circumferentially extending smooth surface is provided between the skirt and the upper head in the interior of the skirt adjacent the attachment of the skirt to the upper head.

According to another aspect of the invention, a cylinder for transporting a hazardous liquid under pressure comprises a cylindrical shell having upper and lower ends, an upper head attached to the upper end of the shell, a lower head attached to the lower end of the shell, said shell and upper and lower heads defining a pressure vessel. A lower skirt is attached to said lower head and extends downwardly therefrom. A pocket assembly in provided said lower skirt, said pocket assembly including a pair of spaced parallel elongated channel members mounted in slots in said skirt, and a bottom plate attached to the bottom of said skirt.

In accordance with a further aspect of the invention a cylinder for transporting a hazardous liquid under pressure comprises a cylindrical shell having upper and lower ends, an upper head attached to the upper end of the shell, a lower head attached to the lower end of the shell, said shell and upper and lower heads defining a pressure vessel and being fabricated from a hypergole compatible material, and said upper and lower heads being attached to said shell by a full penetration butt weld providing a smooth internal surface. A valve system is provided on the upper head for loading and unloading the pressure vessel and an upper cylindrical skirt is attached to said upper head and surrounds said valve system. A lower cylindrical skirt is attached to said lower head and extending downward therefrom, and a pocket assembly is provided in said lower skirt from receiving lifting equipment.

BRIEF DESCRIPTION OF THE DRAWINGS

The objects and advantages of the present invention will become more apparent by reference to the following detailed description and to the accompanying drawings in which.

DETAILED DESCRIPTION

Figure 1:
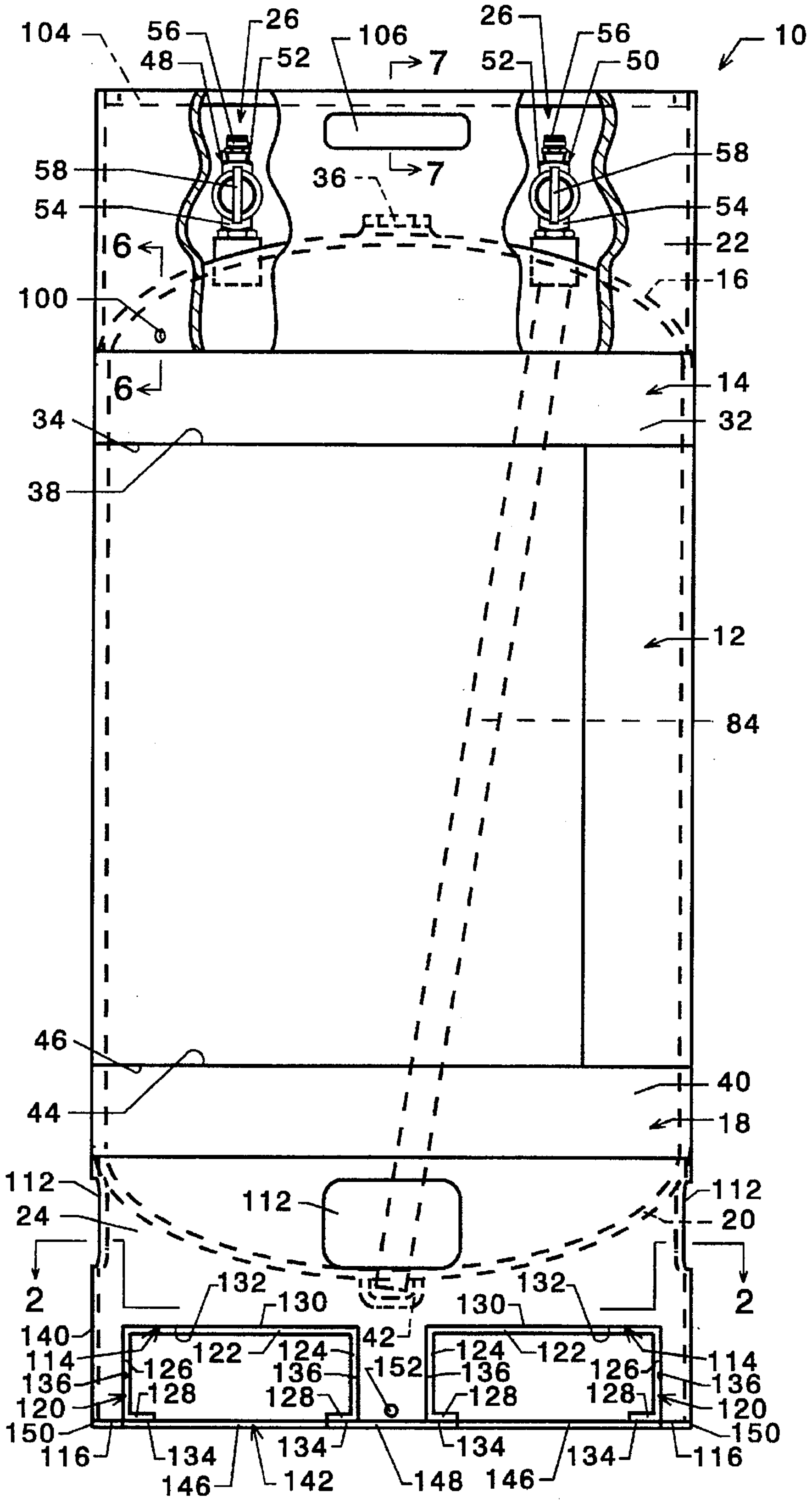
FIG. 1 is an elevation view, partially broken away, of a container constructed in accordance with the present invention.

Referring to the drawings, and particularly to FIG. 1, the is shown a container or cylinder 10 incorporating the features of the present invention and which is designed for use in the transportation and delivery of hazardous materials such as hypergole materials. Examples of hypergole materials for which this cylinder is particularly useful include hydrazines such as dimethylhydrazine, methylhydrazine , anhydrous hydrazine , di-nitrogen tetroxide, and other poisonous of flammable liquids.

The cylinder 10 generally includes a cylindrical shell 12, an upper head 14 attached to the top of the shell 12 and having an ellipsoidally shaped dome 16, a lower head 18 attached to the bottom of the shell 12 and having an ellipsoidally shaped dome 20, an upper skirt 22 attached to the upper head 14, a lower skirt 24 attached to the lower head 18, a valve system 26, and a pocket assembly 28 in the lower skirt 24. The body 12 and heads 14 and 18 are fabricated from a hypergole compatible material. Examples of such material include stainless steel and aluminum, and aluminum alloys. The preferred material is an austenitic stainless steel and specifically ASTM A240 Type 304L or Type 316L stainless steel.

The shell 12 is formed from a sheet of the material by rolling into a cylindrical section and joining along a seam 30 providing a hollow cylindrical body. The seam 30 is joined by welding, preferably a full penetration butt weld which leaves a flush internal surface.

The upper head 14 includes a vertically straight sidewall portion 32 extending downwardly from the ellipsoidal dome 14 and which terminates in a planar bottom edge 34. The outer diameter of the sidewall portion 32 is substantially the same as the outer diameter of the cylindrical shell 12. A bung hole and cap arrangement 36 is provided in the center of the dome 16 of the upper head 14 to provide access to the interior of the cylinder when desired for cleaning and other functions. The upper head 14 may be fabricated by hot pressing or spinning metal techniques.

The planar bottom edge 34 of the upper head 14 is joined to the upper edge 38 of the cylindrical shell 12 by a circumferentially extending closure weld which is preferably a full penetration butt weld. This type of weld is preferable to a joggle butt weld as it produces a substantially flush interior surface free of sharp angles which permits complete and effective internal cleaning.

The lower head 18 is similar to the upper head 14 in that it includes a vertically straight sidewall walled portion 40 extending upwardly from the ellipsoidal dome 20 as viewed in FIG. 1 The outer diameter of the sidewall portion 40 is substantially the same as the outer diameter of the cylindrical shell 12. The lower head 18 is provided with an interior well or sump 42 at its lowest point as shown. The lower head 18 may be fabricated by hot pressing or spinning metal techniques. The planar upper edge 44 of the straight walled portion 40 is attached to the planar bottom edge 46 of the shell 12 by a circumferential weld which, as in the case of the upper head 14 and shell 12, is a full penetration butt weld. The cylindrical shell 12 along with the upper and lower heads 14 and 18 constitutes a pressure vessel capable of holding material under pressure.

The valve system 26 provides a means for communicating with the interior of the pressure vessel and, according to the preferred embodiment, constitutes two valve assemblies 48 and 50 mounted in the dome 16 of the upper head 14 in a manner to communicate with the interior of the pressure vessel. In the embodiment shown, the two valves assemblies 48 and 50 may each be a standard plug valve 52 which includes a valve body 54, a connection 56 for attaching a hose or other conduit, and a multi-turn screw type actuator 58. As shown particularly in FIG. 4, the actuator 58 may include a spindle 60 extending from the valve body 54 and rod-like turn handle 62 connected to the outer end of the spindle 58. Each of the valves 52 is provided with a locking assembly 64 to prevent the accidental opening and closing of the valve 52.

Figure 4:
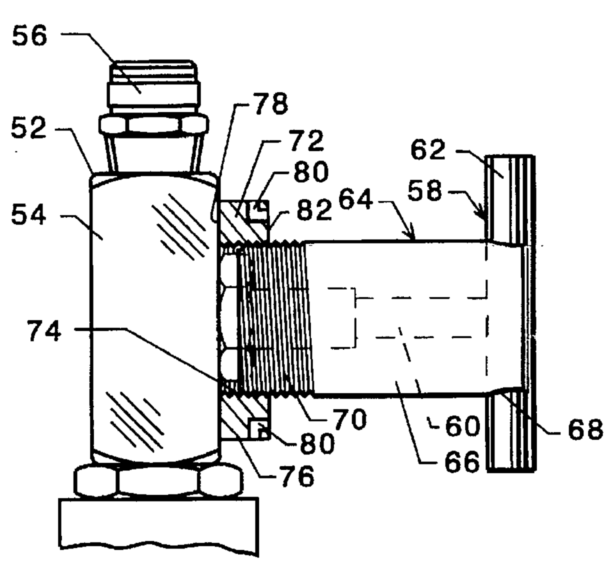
FIG. 4 is an enlarged side elevational view of the valve assembly of the container.
Figure 5:
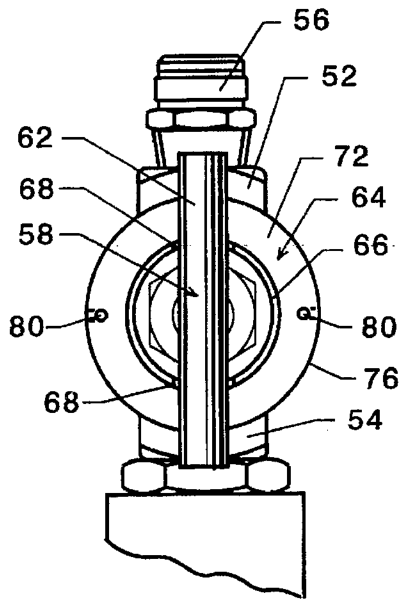
FIG. 5 is an enlarged front elevational view of the valve assembly.

The locking assembly 64, shown in detail in FIG. 4 and 5, comprises a circular tube 66 fabricated from stainless steel or aluminum and which is positioned over the spindle 60 of the valve 52. The tube 66 has a groove or notch 68 in one end which matches with and receives the valve handle 62. The end of the tube 66 opposite the groove 68 is provided with a threaded outer surface 70. A thumbwheel 72, having a bore 74 therethrough provided with matching threads, is threaded onto the threaded surface 70 of the tube 66 as shown. The outer circumferential surface 76 of the thumbwheel 72 may be provided with a coarse diamond knurl (not shown) to increase the gripping thereof.

In operation of the locking assembly 64, the thumbwheel 72 is rotated so that it moves back onto the tube 66 thereby reducing the overall length of the locking assembly 64 and the turn handle 62 of the valve 52 is outside of the groove 68 in the end of the tube. The valve 52 is then free to be operated normally and the spindle 60 may be turned by the handle 62 to the open or closed position of the valve 52. When the valve 52 is in the desired position, either open or closed, the thumbwheel 72 may be turned in the opposite direction to lengthen the locking assembly 64 so that the handle 62 of the valve 52 is positioned in the groove 68 in the end of the tube 66 and the outer face 78 of the thumbwheel 72 abuts against the valve body 54. This will provide an interference fit which will prevent rotation of the valve handle 62 fixing the location of the handle 62 in either the open or closed position of the valve 52.

Figure 6:
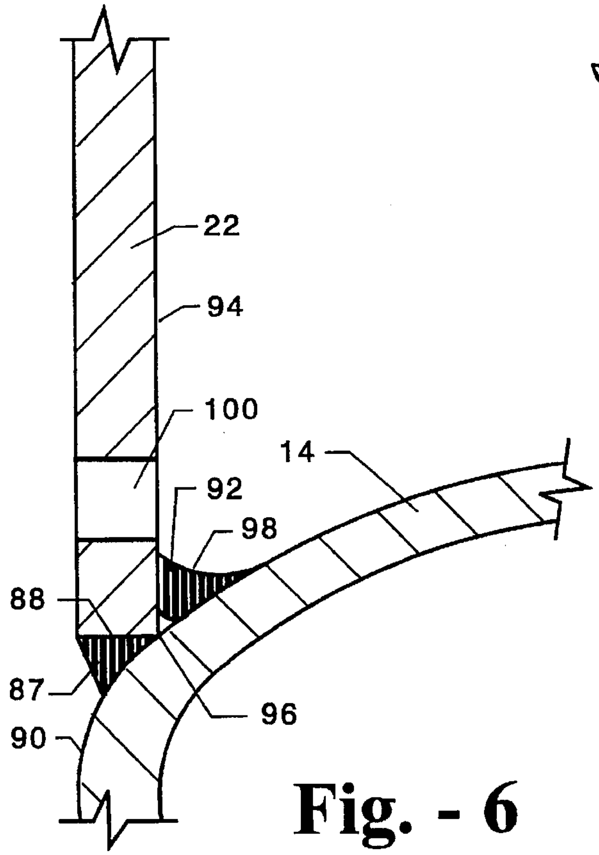
FIG. 6 is an enlarged detail view taken generally in the direction indicated by the line 6—6 of FIG. 1.

The thumbwheel 72 may be provided with a series of holes 80 which extend partially into the inner face 82 of the thumbwheel 72 and then out through the outer circumferential surface 76 as shown in FIGS. 5 and 6. Preferably there are four such holes 72 evenly spaced about the thumbwheel 72. Such holes 72 may be used to receive a locking wire (not shown) to lock the thumbwheel 72 in position after the locking assembly 64 has been set thereby providing a security seal.

One of the valves 52 of the valve system 26, the right hand valve 52 as view in FIG. 1, is designated for use in withdrawing the liquid from the interior of the pressure cylinder. A dip pipe 84 is provided in the interior of the cylinder with one end attached to the port of the valve 52 which is within the cylinder and its other end positioned. within the well or sump 42 in the dome 20 of the lower head 18. The other valve 52 is designated for use in supplying a pressurized gas to the interior of the cylinder which will force the removal of the liquid contents through the dip pipe 84 and out through its associated valve 52 when that valve 52 is opened.

Alternatively, the valve system 26 may comprise lever-actuated, quarter-turn, ball valves which provide a positive indication of the open and closed positions of the valve. If this type of valve is used, the lever may be provided with a hole through which a wire or other restraining devise may be passed to hold the lever in the open or closed position and prevent the accidental movement of the lever into its other position, and also provide a security seal.

The upper skirt 22 comprises a rolled cylindrical member joined at a longitudinal seam (not shown) by a suitable welding technique such as butt weld. The upper skirt 22 has an outer diameter substantially equal to the outer diameter of the sidewall portion 32 of the upper head 14. The skirt 22 is attached to the upper head 14 as shown in FIG. 6 by providing a circumferential weld 87 between the flat end surface 88 of the skirt 22 and the outer surface 90 of the head 14 by conventional welding techniques. Additionally, an inner circumferential arc weld 92 is provided between the interior surface 94 of the skirt 22 and the outer surface 90 of the upper head 14 at a point adjacent the bottom interior edge 96 of the skirt 22. This weld 92 may be made by the flux-cored arc welding process using hypergole compatible metal deposited in such a fashion such that the weld face 98 provides a smooth and slightly concave surface. This feature allows for ease in cleaning and decontaminating as there is no sharp crevice between the skirt 22 and head 14 in which the hazardous material might become lodged.

The upper skirt 22 is also provided with a threaded drain port 100 extending through the wall of the skirt 22 immediately above the interior weld 92. A plug or drain connection such as a drain valve may be attached to the drain hole during loading and unloading of the cylinder 10. The upper skirt 22, along with the interior circumferential weld 92 and drain port 100, provide for the containment and/or control of any hypergole spillage that may occur as a result of a malfunction of the valving or connections during loading and unloading of the cylinder 10 and permit controlled evacuation.

Figure 7:
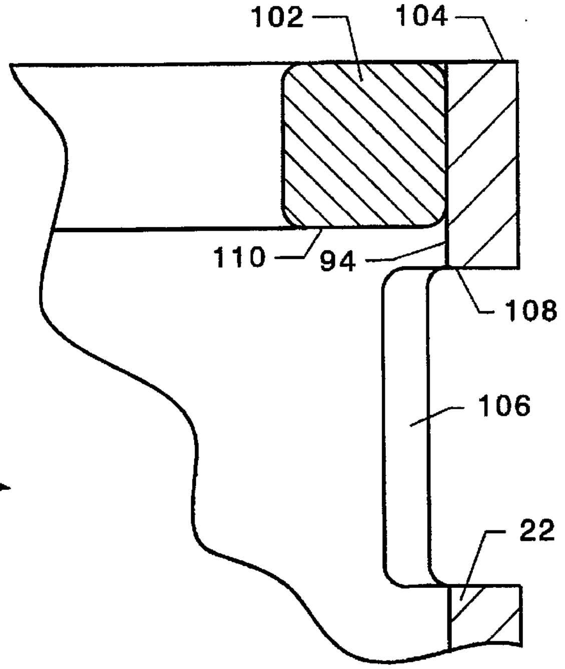
FIG. 7 is an enlarged detail view taken generally in the direction indicated by the line 7—7 of FIG. 1.

As shown in detail in FIG. 7, the upper skirt 22 is also provided with a reinforcing ring 102 attached to its inner surface 94 adjacent the upper edge 104. The retaining ring.102 may be fabricated from hypergole compatible material such as stainless steel, aluminum and aluminum alloys, and attached to the upper skirt 22 by welding or other suitable adhesion techniques. Two openings 106, diametrically opposed to each other, may be provided in the upper skirt 22 with the upper edge 108 of each opening 106 being positioned slightly below the bottom edge 110 of the retaining ring 102. The openings 106 provide lifting eyes for attachment of a lifting device such as a crane line to facilitate moving of the cylinder 10.

The lower skirt 24, like the upper skirt 14, is a rolled cylindrical member, joined at a longitudinal seam (not shown) by a suitable welding technique such as a butt weld. The lower skirt 24 has an outer diameter substantially equal to the outer diameter of the sidewall portion 32 of the lower head 18, although it may be of smaller diameter. The lower skirt 24 may be attached to the lower head 18 in a manner similar to that of the connection of the upper skirt 22 to the upper head 14. The lower skirt 24 has four openings 112 providing inspection and access ports for the bottom skirt cavity. The four openings 112 are evenly spaced about the periphery of the skirt 24 and are positioned immediately below the connection of the skirt 24 to the lower head 18.

The lower skirt 24 includes the pocket assembly 28 which is designed to accept all forklift and pallet lift configurations. The bottom skirt 24 is provided with two sets of facing slots 114 extending upwardly from its bottom surface 116 which form cutouts for the reception of a channel member 120 positioned in each set of slots 114 to form a pair of spaced parallel channel members 120. Each channel member 120 is a generally elongated C-shaped member with its opening facing downwardly as shown. More specifically, each channel member 120 includes a flat upper portion 122, two spaced sidewalls 124 and 126 extending downwardly from and perpendicular to the flat upper portion 122, and an inturned flange portion 128 at the bottom of each sidewall 124 and 126 extending the entire length of the channel member 120.

Figure 2:
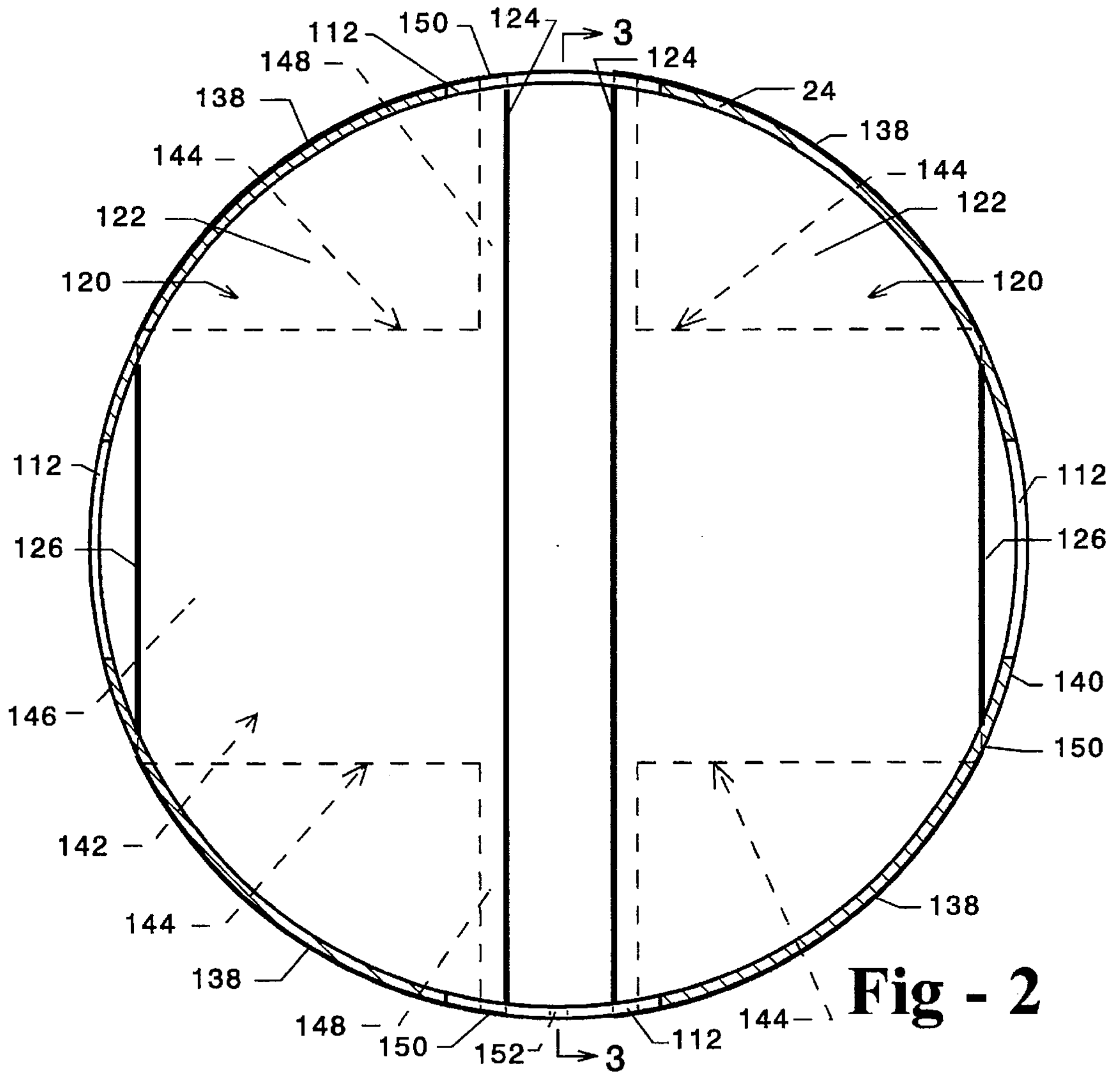
FIG. 2 is a horizontal sectional view of the container taken along the lines 2—2 of FIG. 1.

One channel member 120 is mounted in each set of facing slots 114 in the lower skirt 24 such that the top surface 130 of the upper portion 122 of the channel member 120 lies adjacent the bottom 132 of the slot 114 and the bottom surface 134 of the sidewall flanges 128 are planar with the bottom surface 116 of the lower skirt 24. Each of the side walls 124 and 126 of each of the channel members 120 are positioned adjacent a side wall 136 of the slots 114 in the skirt 24. The two channel members 120, as seen in FIG. 2, have their axes of elongation parallel to each other. The end faces 138 of each of the channel members 120 are curved so that they are substantially flush with the outside surface 140 of the skirt 24, although they may protrude out from the skirt 24 if desired. The channel members 120 are preferably fabricated from stainless steel, although other compatible materials such as aluminum may be used. The channels members 120 may be attached to the lower skirt 24 by welding, bolting, adhesive bonding or other suitable methods.

A bottom plate 142 is attached to the bottom surface of the lower skirt 24 by suitable means such as welding. The bottom plate 136, rather than having a circular configuration, is provided with cutouts 144 which form, as shown by the dotted lines in FIG. 2, a generally cross shaped configuration. This configuration provides a first portion 146 which extends across the bottom of the channel members 120 in a direction perpendicular to their axes. The first portion 146 has a width slightly greater than the length of the outer side portions 126 of the channel members 120. Two smaller second portions 148 extend perpendicularly from the first portion 146 in opposite directions. Each of the second portions 148 has a width such it covers the space from the free edge of the flange 128 on the inner sidewall 124 of one channel member 120 to the free edge of the flange 128 on the inner side wall 124 of the other channel member 120 as shown most clearly in FIG. 1. The outer ends 150 of the first and second portions 146 and 148 of the bottom plate 142 extend to and overlap the bottom surface 116 of the lower skirt 24 and are generally flush with the outside surface 140 thereof.

Figure 3:
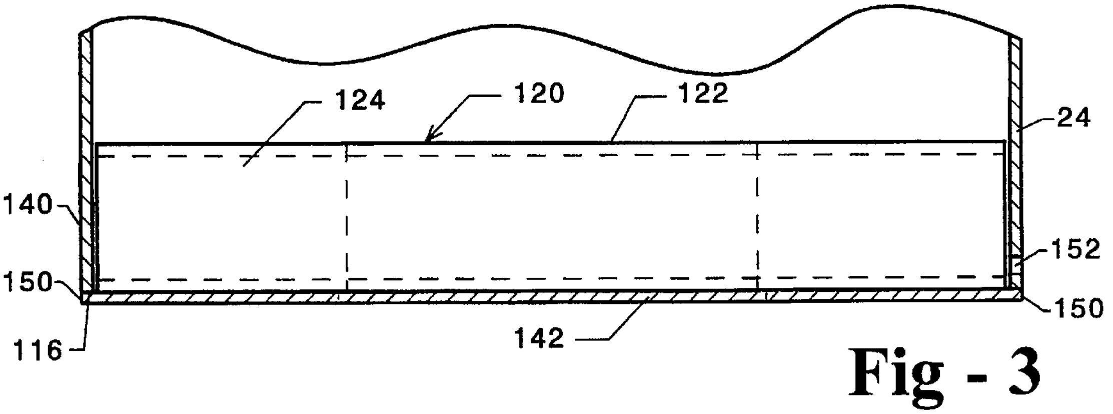
FIG. 3 is a vertical sectional view of the bottom portion of the container taken along the lines 3—3 of FIG. 2.

The lower skirt 24 may be provided with a threaded drain port 152 positioned in the skirt 24 adjacent the bottom surface 116 thereof and between the two channels 120 as shown particularly in FIGS. 1–3. The drain port 152 provides for the evacuation of the bottom skirt cavity in the event that water or other contaminants become introduced into the cavity. Additionally, the drain port 152 may serve as a means to which a tag line may be attached for use when the cylinder 10 is being transported by a hoist.

If desired, a plastic shroud or cover may be provided to encase the upper skirt 18 and protect the valve system 26 from contamination during transit of the cylinder 10. The shroud may be a cup shaped member having a planar portion with a circular side wall extending perpendicular therefrom of an internal diameter to snugly fit about the outside of the upper skirt.

Cylinders may be constructed in accordance with the present invention to hold various capacities of liquid under pressure although the present invention is particularly appropriate for capacities in the range of 6 to 120 gallons. The thickness of the material comprising the shell 12 and upper and lower heads 14 and 18 should be sufficient to withstand pressures up to at least 900 psi and preferably up to 2000 psi.

By way of example, the cylinder shown in the drawing may have a 55 gallon capacity. The thickness of the shell 12 and heads 14 and 18 may be 3/16". The thickness of the upper skirt 22 may be 0.187 inch and the thickness of the lower skirt 24 may be 0.135 inch.

With the construction of the present invention, a cylinder for holding hazardous material is provided which has no blind cavities in the exterior design which can trap contaminants. Effective inspection and decontamination of all surfaces is possible. Further the design permits handling of the cylinder by conventional methods and equipment.

While the invention has been described above with reference a specific embodiment thereof, it is apparent that many changes, modifications and variations can be made without departing from the concept disclosed herein. Accordingly, it is intended to embrace all such changes, modifications and variations that fall within the spirit and broad scope of the appended claims.

What is claimed is:

1. A cylinder for transporting a hazardous liquid under pressure comprising:

a. a cylindrical shell having upper and lower ends, b. an upper head attached to the upper end of the shell, c. a lower head attached to the lower end of the shell, said shell and upper and lower heads defining a pressure vessel, d. a lower skirt attached to said lower head and extending downwardly therefrom, e. a pocket assembly in said lower skirt, said pocket assembly including a pair of spaced parallel elongated channel members mounted in slots in said skirt, wherein said channel members are generally C-shaped with the opening facing downwardly, and f. a bottom plate attached to the bottom of said skirt, wherein said bottom plate has cutouts therein forming a cross-shaped configuration, wherein said channel members include an upper flat portion and opposing side walls extending downwardly therefrom, said bottom plate including a first portion extending across said channel members and having a width at least as large as the length of the smaller side wall of said channel members, and two second portions extending perpendicular to said first portion in opposite direction and having a width to overlap at least a portion of the bottom of the inside side walls of the channel members.

2. The cylinder of claim 1 further including a drain port in said lower skirt adjacent the bottom edge thereof and positioned between the two channel members.

3. The cylinder of claim 1 wherein said lower skirt has inspected openings therein spaced about its periphery and positioned above said channel members.

* * * * *